United States Patent [19]

Hatton

[11] Patent Number: 5,642,854

[45] Date of Patent: Jul. 1, 1997

[54] CORN CONTAINER

[76] Inventor: Roger C. Hatton, 2727 Bacom Point Rd., Pahokee, Fla. 33476

[21] Appl. No.: 647,185

[22] Filed: May 9, 1996

[51] Int. Cl.⁶ .................................. B65D 5/42; B65D 5/66
[52] U.S. Cl. ......................... 229/149; 229/120; 229/128
[58] Field of Search ..................................... 229/120, 128, 229/149, 154

[56]           References Cited

U.S. PATENT DOCUMENTS

| | | |
|---|---|---|
| 2,285,731 | 6/1942 | Magley ................................. 229/128 |
| 2,358,943 | 9/1944 | Smith ................................... 229/154 |
| 2,939,624 | 6/1960 | Wilson ................................. 229/120 |
| 3,366,496 | 1/1968 | Bomar et al. . |
| 3,392,904 | 7/1968 | Wei . |
| 3,536,249 | 10/1970 | Houston . |
| 3,660,016 | 5/1972 | Clark . |
| 3,695,505 | 10/1972 | Wolf .................................... 229/120 |
| 3,863,829 | 2/1975 | Merrill . |
| 3,881,648 | 5/1975 | Hall . |
| 3,899,121 | 8/1975 | Herbetko . |
| 4,105,152 | 8/1978 | Elward ............................... 229/23 R |
| 4,127,228 | 11/1978 | Hall . |
| 4,142,665 | 3/1979 | Jewell et al. . |
| 4,175,691 | 11/1979 | Cornell et al. . |
| 4,201,330 | 5/1980 | Gilbert . |
| 4,313,547 | 2/1982 | Osborne .............................. 220/416 |
| 4,353,495 | 10/1982 | Jes . |
| 4,418,863 | 12/1983 | Kimbrell, Sr. . |
| 4,529,117 | 7/1985 | Brundage . |
| 4,565,316 | 1/1986 | Jes ...................................... 229/149 |
| 4,600,142 | 7/1986 | Quaintance ........................ 229/149 |
| 4,709,852 | 12/1987 | Stoll ................................... 229/119 |
| 5,014,905 | 5/1991 | Cassidy ............................. 229/113 |
| 5,018,663 | 5/1991 | Corso ................................. 229/117 |
| 5,181,651 | 1/1993 | Oppenheim ....................... 229/121 |
| 5,263,612 | 11/1993 | Nederveld ......................... 229/112 |
| 5,325,602 | 7/1994 | Nainis et al. ...................... 229/120 |
| 5,462,220 | 10/1995 | Bacchetti et al. ................. 229/112 |

*Primary Examiner*—Gary E. Elkins
*Attorney, Agent, or Firm*—Quarles & Brady

[57]            ABSTRACT

A light-weight, reusable plastic corn container uses a locking lid tab to hold the corn in a tight bundle, augmenting the strength of the container despite large water access ports used for hydrocooling. A multiple section lid and staggered lid locking slots permit the container to tightly hold different volumes of corn and to expand to contain comparable numbers of ears as the growing season progresses.

11 Claims, 3 Drawing Sheets

CORN CONTAINER

FIELD OF THE INVENTION

The present invention relates to containers for storing and shipping fresh ears of corn, and in particular, to a reusable container providing improved hydrocooling of the contained corn.

DESCRIPTION OF THE ART

Corn is often shipped in wire-bound wooden crates having spaced slats permitting the introduction of chilled water (hydrocooling) to maintain the freshness of products shipped.

Wire-bound crates can be difficult to handle, presenting rough edges and sharp surfaces to those packing and unpacking the crates. The wood supports certain types of fungus growth which may make reusing such crates inadvisable. On the other hand, using the crates only once presents a severe disposal problem.

SUMMARY OF THE INVENTION

The present invention provides a container particularly adapted to shipping ears of corn. It is constructed of a single sheet of plastic carton stock, and therefore may be readily cleaned and reused, or alternatively shredded for recycling. Practical use of this plastic carton material is possible because a locking tab on the lid tightly bundles the corn, when the corn is arranged in a vertical orientation, so that the corn itself augments the strength of the container. This allows large ports to be cut in the walls of the container to admit hydrocooling water without adversely affecting the strength of the container or increasing cost of materials. Adjustment features in the locking of the lid allow the volume of the tightly packed corn contained in the container to vary somewhat as the corn ripens and enlarges in girth during the growing season while permitting an essentially uniform 48–50 ears of corn per container.

Specifically, the container has a bottom with a longitudinal dimension substantially equal to the length of an ear of corn. Front and back upstanding side walls attach to the bottom, the front wall having at least two vertically spaced tab-receiving slots. A left and right upstanding side wall attach to the lower edges of the bottom and have at least two vertically spaced tab-receiving slots as well. A lid is attached to the top of the back wall, having transversely extending ears terminating in ear tabs and having a nose tab attached to an edge of the lid opposite the edge of the lid attached to the back side wall. The ear tabs engage different ones of tabs on the left and right side walls and the nose tab may engage different ones of the slots on the front upstanding side wall to allow the lid to be pulled tightly around different volumes of contained corn. The nose tab may be constructed to lock into its corresponding slot.

Thus, it is one object of the invention to provide a corn holding container that may be packed tightly with corn arranged with the ears extending in the longitudinal direction so that the corn ears augment the strength of the container, reducing material costs and weight.

It is yet another object of the invention to allow the volume of the container to vary according to the average volume of ears of corn as that volume increases during the growing season, thus to preserve an approximate 48 count of ears of corn per container without the need to stock containers of different sizes.

The front and back side walls may include a plurality of opposed water rinse ports, sized to permit free water flow through the container when filled with corn.

Thus, it is another object of the invention to provide a container that has ample water cooling slots. The wrapping action of the lid to hold the corn tightly in alignment within the container provides increased strength to the container, permitting larger ports.

The polymeric carton stock may have a corrugation axis of greatest buckling strength, and the corrugation axis may be aligned in the longitudinal direction. The bottom may be attached to transversely extending support panels, substantially equal in area to the left and right upstanding side wall, the support panels folding upward from the bottom to provide resistance to buckling.

Thus, it is another object of the invention to allow stacking of the containers on their sides so that the water ports are aligned and multiple containers of corn may be hydrocooled at the same time, and yet to augment the strength of the container in this dimension.

The lid may include a back hinge section, hingeably attached at one edge of the center portion of the lid, and at an opposite edge, hingeably attached to the top edge of the back side wall. Similarly, the lid may include a front hinge section, hingeably attached at one end of a center portion of the lid, and at an opposite edge hingeably attached to the nose tab.

Thus, it is another object of the invention to allow the lid to conform to a curved surface of contained corn so as to hold it more tightly in position.

The foregoing and other objects and advantages of the invention will appear from the following description. In this description, reference is made to the accompanying drawings which form a part hereof, and in which there is shown by way of illustration a preferred embodiment of the invention. Such embodiment does not necessarily represent the full scope of the invention, however, and reference must be made, therefore, to the claims for interpreting the scope of the invention.

DESCRIPTION OF THE PREFERRED EMBODIMENT

Figure 1:
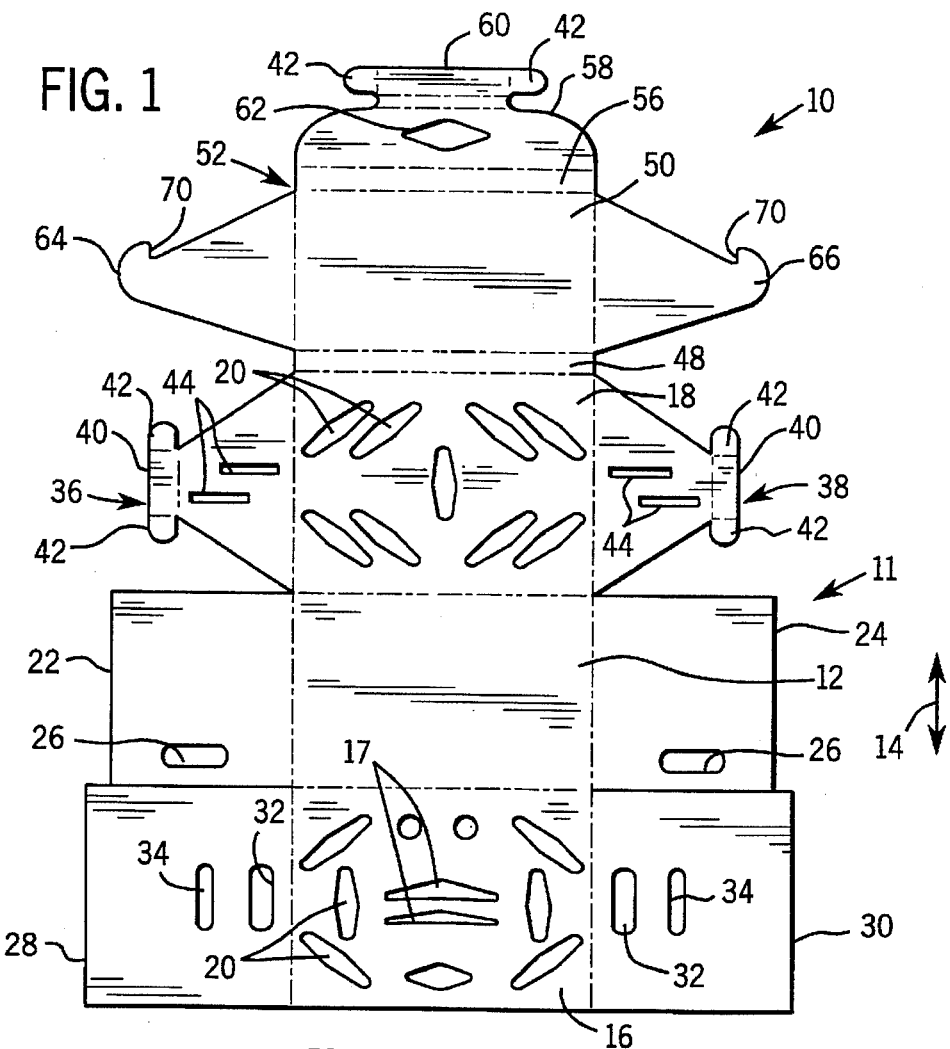
FIG. 1 is a plan view of a blank of material of polymeric carton stock from which the container of the present invention is constructed.
Figure 2:
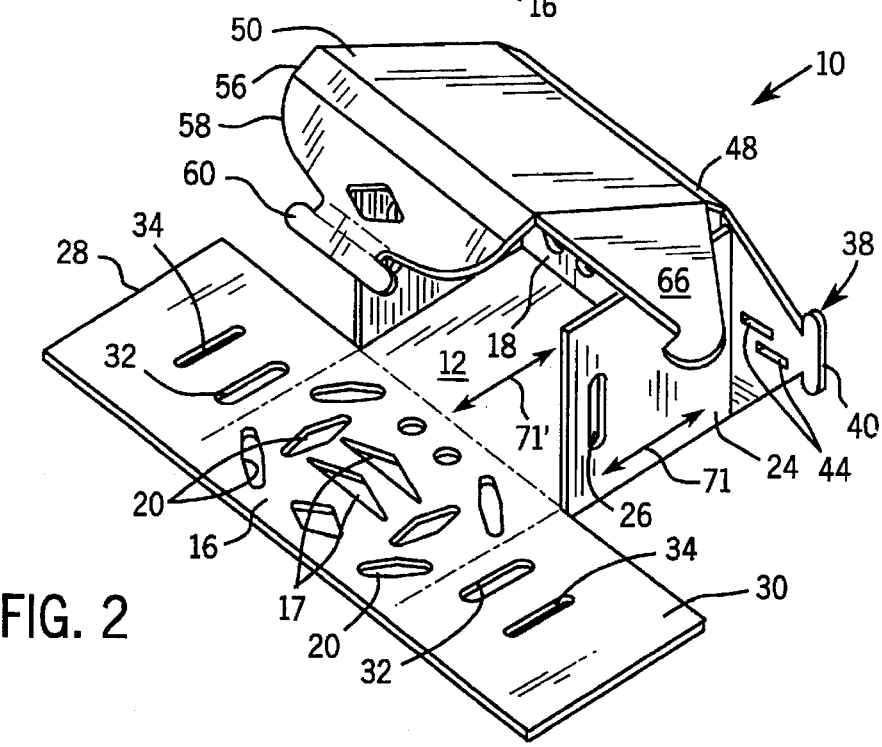
FIG. 2 shows a partial folding of the blank of FIG. 1 into a container of the present invention, and, in particular, shows inner support panels attached to the bottom, whose orientation is such as to provide greater stacking strength of the carton.

Referring now to FIGS. 1 and 2, a blank 11 from which the present container 10 may be folded, and into which the present carton may be collapsed, includes a generally rectangular base 12 having a height along a longitudinal axis 14 equal to that of the height of an average ear of corn so that ears of corn may be laid against the base 12 in rows along axis 14 to stretch from the front to back of the base without overhang.

Attached to longitudinally opposed edges of the base 12 are a front and rear wall 16, 18, each also being generally rectangular and having multiple water access ports 20 cut throughout their surface. Generally, the corrugated material of the blank 11 has an axis of greatest buckling strength aligned with the longitudinal axis 14. A number of the water access ports 20 are cut diagonally with respect to this axis 14 so as to reduce the effect of the ports 20 on the strength of the front and rear walls 16, 18.

Front wall 16 also includes two longitudinally extending slots 17 displaced longitudinally from each other such as will serve as an attachment point for a lid as will be described.

Attached to a left and right edge of the base 12 are support panels 22 and 24, respectively. Each of front and rear wall 16, 18 and support panels 22, 24 are hinged at their point of attachment to base 12 by means of a creasing of the blank 11 so that they may be folded upward to form upstanding side walls of the ultimate container. Accordingly, the distance from the point of attachment of each of these elements to the base 12, and their furthest extent from the base 12 is equal so that when folded they extend upward by substantially equal amounts. Support panels 22, 24 include hand grip holes 26 positioned at the front edge of the container 10 when it is fully assembled with the base 12 at the bottom. During shipping, however, as will be described, these hand grip holes 26 will be at the top of the container 10.

Attached to the left and right side of front wall 16 and extending transversely away from front wall 16 are left and right walls 28, 30, respectively, each generally rectangular in dimension. Hand grip holes 32 corresponding in dimension to hand grip holes 26 and ultimately superimposed with hand grip holes 26 extend longitudinally in the unfolded blank 11 near the inner edges of left and right walls 28, 30. Longitudinal locking slots 34 are also cut in left and right walls 28, 30, and used to assemble the container together as will be described.

Figure 7:
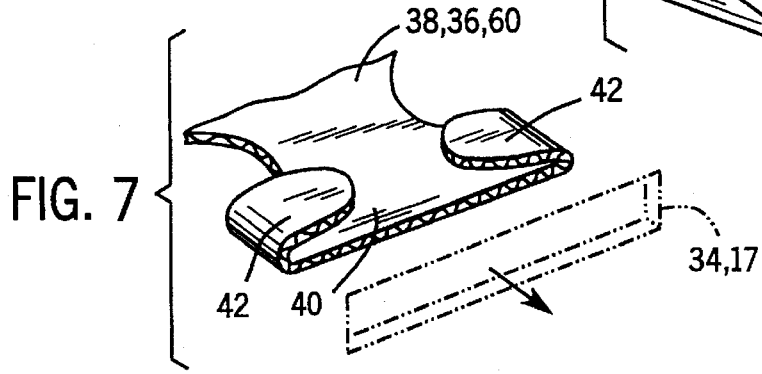
FIG. 7 is a detailed view of a locking tab used to assemble the container of the present invention, positioned with respect to a slot shown in phantom, showing the folding in of flaps on the tab which serve to lock it into position after it has been inserted through the slot.

Extending transversely from the left and right side of rear wall 18 are left and right flaps 36, 38, terminating at tabs 40, ultimately to be received by slots 34 when the blank 11 is folded into a container 10. Referring also to FIG. 7, each of the tabs 40 extending transversely from the ends of flaps 36, 38 may have further longitudinally extending folding locking flaps 42, which may be folded inward toward the tabs 40 so as to reduce the width of those tabs for insertion into the slots 34. Once insertion is completed, the locking flaps 42 may be folded outward again to lock the tabs 40 into the slots 34. In this manner, the assembly of tabs 40 into slots 34 may be resist dislodgment when the container is tightly filled with corn, as will be described.

Flaps 36, 38 each also have two transversely extending slots 44. The slots displaced longitudinally from each in the blank 11 (vertically in the assembled carton, when the container 10 rests on the base 12) to provide attachment points for a lid as will be described below.

Attached to a remaining edge of rear wall 18, opposite from the line of attachment of rear wall 18 and base 12, is a hinge section 48 extending the width of the rear wall 18 and providing a first hinge line in its attachment with rear wall 18 and a second parallel hinge line in its attachment to a center portion 50 of the lid 52. The opposite edge of the center portion 50 of the lid 52 is attached to yet another hinge section 56 providing a third parallel hinge line where hinge section 56 attached to the center portion 50 of the lid 52 and a fourth parallel hinge line where the hinge section 56 attaches to a front flap 58.

Front flap 58 in turn attaches to a nose tab 60. Nose tab 60, like tabs 40 on flaps 36 and 38, has side extending locking flaps 42 that permit it to lock when inserted in ones of slots 17 as will be described. Front flap 58 also has a water admitting port 62 which, when the container is fully folded, align with port 20 in the from wall 16.

Attached to the left and right side of the center portion 50 of the lid 52 and extending transversely therefrom are left and right ear extensions 64, 66, terminating at their farthest most transverse edges with hooks 70, which may be engaged with ones of slots 44 previously described when the blank 11 is folded into a container 10.

Figure 3:
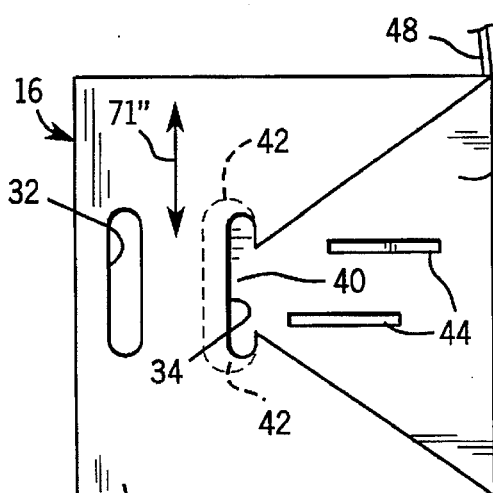
FIG. 3 is a fragmentary side elevational view of the carton with the lid open showing locking tabs used to hold the side walls into position.

Referring now to FIGS. 2 and 3, in folding the blank 11 into a carton, the base 12 may be placed against a flat horizontal surface, and support panels 22, 24 folded upward perpendicularly therefrom. Note that the axis of strength 71 of the carton material for support panels 22, 24 is generally aligned with the corresponding axis 71'.

Figure 6:
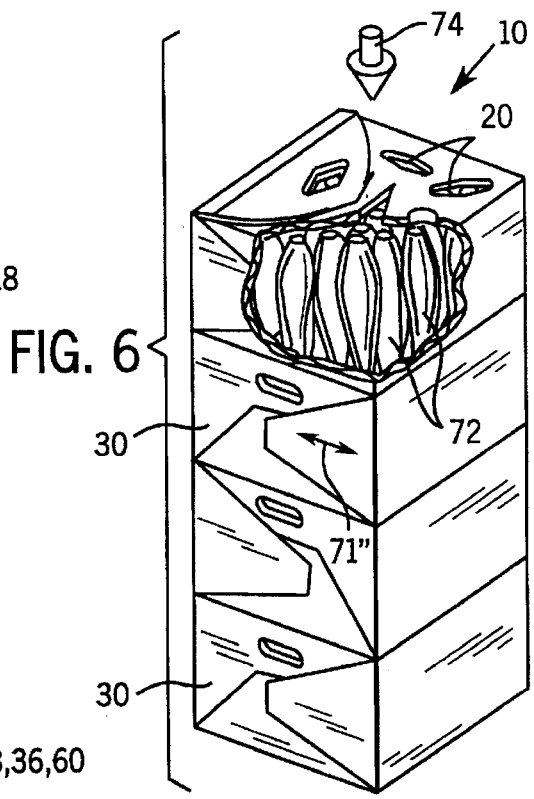
FIG. 6 is a perspective view in partial cut-away of a set of containers of the present invention as stacked for hydrocooling, showing the orientation of the corn within the containers.

Front wall 16 may then be folded upward to be perpendicular to base 12 carrying with it left and right walls 28, 30, which may then be folded rearward with respect to front wall 16 to abut and be parallel to support panels 22, 24. Note that the axis of strength 71" of left and right walls 28 and 30, when folded, is perpendicular to that of support panel 24. Thus, when the container 10 are stacked as shown in FIG. 6, the vertical load of the weight of the cartons will be better resisted because of the orientation of the axis of strength of panels 22, 24.

Next, rear wall 18 is folded upward carrying with it left and right flaps 36, 38 as well as the lid 52 and the portions of the blank 11 attached to the lid 52. When rear wall 18 is vertically disposed, flaps 36, 38 are folded forward and the tabs 40 (on flaps 38 and 36) are inserted into corresponding slots 34 (on left and right walls 28 and 30) with locking flaps 42 folded inward, after which locking flaps 42 fold outward locking tabs 40 in place in slot 34 to resist outward movements of front and rear walls 16, 18 under the force of the contained corn. Now the container 10 is ready for loading with 48–50 ears of corn loaded so that each ear extends between the front and rear walls 16 and 18.

Figure 4:
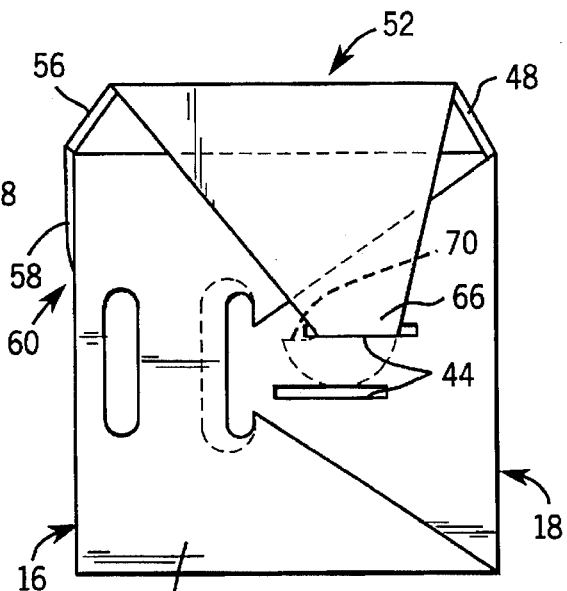
FIG. 4 is a side elevational view similar to that of FIG. 3 showing the lid in a first expanded volume configuration.

Referring now to FIGS. 2 and 4, the next step of the assembly folds the lid 52 downward across the top of the walls 16, 18, 30, and 28 to contain corn held within the volume defined by the base 12, the walls 16, 18, 30, and 28. The nose tab 60 is then engaged within one of the slots 17 of the from wall 16 and locked in place by an outward extension of locking flaps 42 of nose tab 60 when the tab is positioned within the slot 17. At this time, hooks 70 of ear extensions 64, 66 are engaged in one of slots 44 in the corresponding side flaps 36, 38.

In a first configuration, providing expanded container volume and shown in FIG. 4, nose tab 60 is placed in the upper slot 17 and hooks 70 (on ear extensions 64 and 66) are engaged in the upper slots 44. Hinge sections 56 and 48 angle upward from the upper edges of rear wall 18 and from wall 16 to tightly belt the contained corn within the volume of the container conforming somewhat to the tapered shape of a typical ear.

Figure 5:
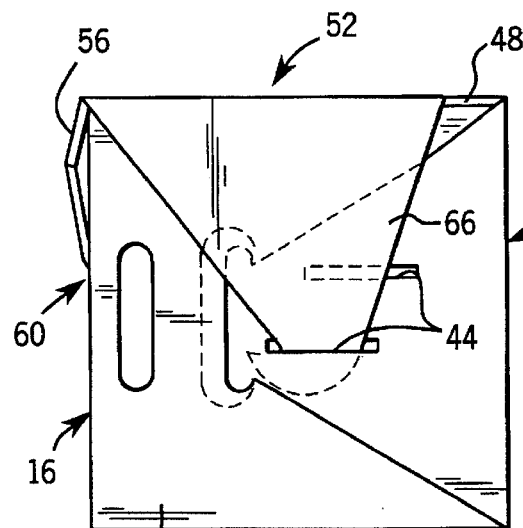
FIG. 5 is a figure similar to that of FIG. 4 showing the container in a second lower volume configuration.

In a second configuration, shown in FIG. 5, and having lower contained volume but still holding the contained corn tightly, the hooks 70 on ear extensions 64, 66 are placed in the lower slots 44 and nose tab 60 is placed in the lower slot 17. In this case, hinge section 48 lies flat atop of the container 10, bridging the upper surface of left and right walls 28, 30. Front hinge section 56 extends vertically downward along front wall 16.

This ability of the container 10 to be configured in one of two volumes allows substantially equal numbers of ears of corn to be placed in the container and held tightly therein at varying times during the growing season when the girth of the corn will be increasing.

Referring now to FIG. 6, the ears of corn 72 are placed within the container in rows against the base 12, with the axis of the cobs aligned with the longitudinal axis 14 of the base to extend between the front wall 16 and the rear wall 18. In use, therefore, the base 12 is oriented in a vertical plane with the container 10 on its side and with the ports 20 at the top and bottom surface of the container 10 as it is stacked. Thus, hydrocooling water 74 may pass into and through each container in the stack before draining completely out of the bottom container through ports 20. The ears of corn 72 provide significant support strength to the container, allowing the ports 20 to be enlarged with the container 10 deriving some strength from the tightly enclosed ears of corn 72. The support provided by the ears of corn 72 relies on the ability of the lid 52 to be drawn tightly against the contained ears of corn 72 so that the ears of corn 72 remains aligned and pressed against the inner surfaces of the container 10. Note that the axis of strength 71" of the left and right walls 28, 30 are oriented in the wrong direction for maximum stacking strength, and thus the support panels 22, 24 are important in providing additional stacking strength to the container 10.

Figure 8:
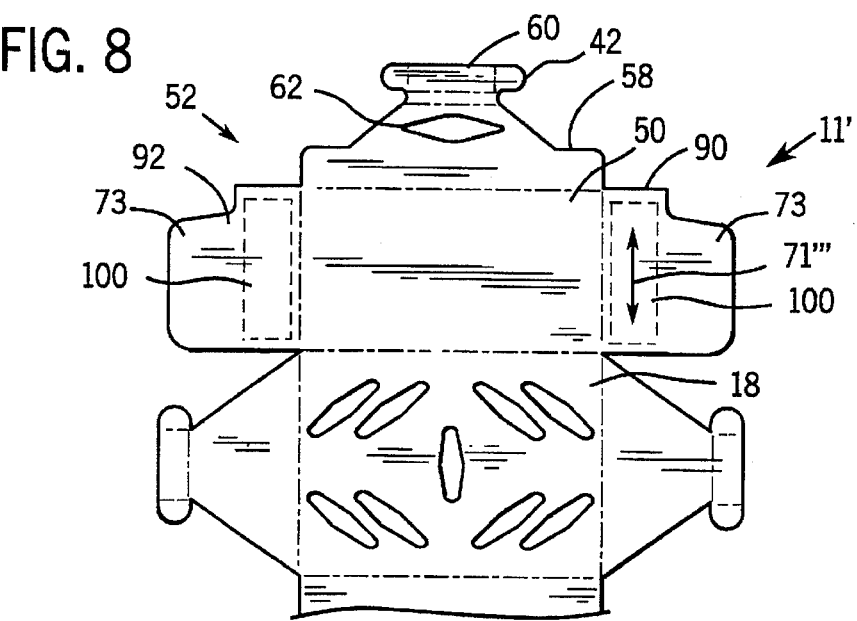
FIG. 8 is a fragmentary plan view similar to that of FIG. 1 of an alternative embodiment of the blank differing in the construction of ear extensions so to provide further support in stacking.

Referring now to FIG. 8, in a second embodiment of the invention, the blank 11' is simplified by removing hinge sections 48 and 56 and attaching front flap 58 directly to center portion 50 of the lid 52 and attaching the opposite edge of the center portion 50 directly to the rear wall 18.

The blank 11' is also modified with respect to left and right ears 64 and 66 which are replaced with left and right secondary support flaps 92 and 90 that may be fit within the container when the lid 52 is closed. Secondary support flaps 92 and 90 are attached to hinge from the left and right side of the lid's center portion 50 (the center portion is enlarged to be of equal dimension to the base 12) and are dimensioned so that one edge of the secondary support flaps 90 and 92 extends transversely from the center portion 50 along the line formed by the attachment of the center portion 50 to the front flap 58 for a distance to form a top of a support post 100 comprised of a rectangular area of the secondary support flaps 90 and 92 running along their edges of attachment to center portion 50. When the containers 10' are stacked, as in FIG. 6, this support post 100 provides an area of material having the axis of strength 71'" vertically aligned and positioned on the lid side of the box (having the least corner support) to resist crashing.

Figure 9:
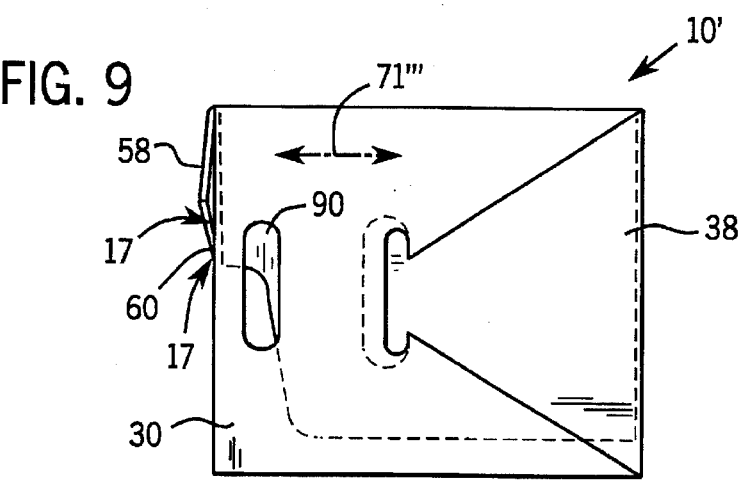
FIG. 9 is a figure similar to that of FIG. 5 showing a first low volume configuration of the container of FIG. 8.
Figure 10:
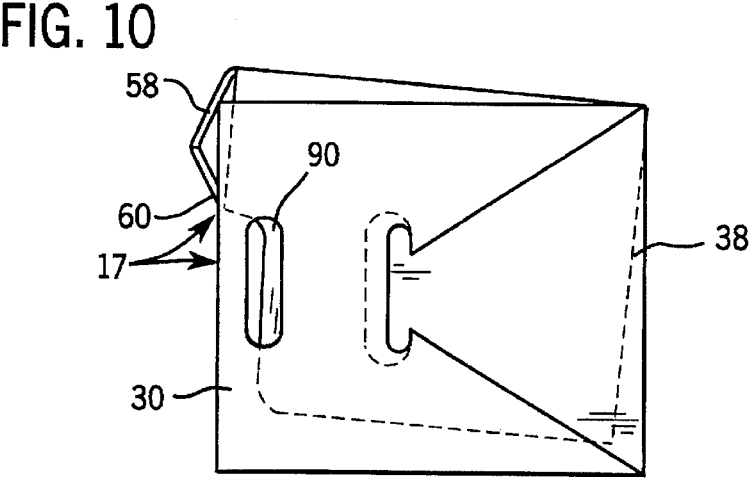
FIG. 10 is a figure similar to that of FIG. 4 showing a high volume configuration of the container of FIG. 8.

Referring to FIGS. 9 and 10, the lid 52, as previously described, may be locked to the front wall 16 by tab 60 in either of two positions to both ensure that the contained corn is tightly belted by the lid 52 to impart maximum strength to the container 10' and to accommodate different sizes of ears yet maintain a constant ear count.

The construction of the container 10 or 10' in which the strength is augmented by the support panels 24 and the locking tab of the lid 52 which holds the ears of corn 72 in tight orientation within the volume of the container 10, allows the container to be constructed of generally available polymeric carton stock readily commercially available. This material, unlike wood, will not support fungal growth and may be readily washed and reused, or, given its homogenous nature, shredded and recycled. The material eliminates many of the hazards of wood and wire crates in terms of sharp or abrasive edges or surfaces.

The above description has been that of a preferred embodiment of the present invention. It will occur to those that practice the art that many modifications may be made without departing from the spirit and scope of the invention. In order to appraise the public of the various embodiments that may fall within the scope of the invention, the following claims are made.

I claim:

1. A container for ears of corn folded from a single sheet of polymeric carton stock, the container comprising:

a bottom having a longitudinal dimension substantially equal to the length of an ear of corn;

a front and back upstanding sidewalls attached at lower edges to the bottom and longitudinally opposed across the bottom, the front sidewall having a tab receiving slot;

a left and right upstanding sidewall attached at lower edges to the bottom and transversely opposed across the bottom;

a lid hingeably attached at a first edge to a top edge of the back sidewalls and having a locking nose tab attached to a second edge of the lid opposite the first edge;

wherein the nose tab may be locked into the tab receiving slot on the front upstanding side wall to allow the lid to compressibly hold a plurality of contained ears of corn.

2. The container of claim 1 wherein the left and right upstanding sidewalls extend the full longitudinal width of the bottom to provide stacking support to the completed container.

3. The container of claim 1 wherein the front and back sidewalls include a plurality of opposed water rinse ports, sized to permit free water flow through the container when filled with corn.

4. The container of claim 1 wherein the polymeric cartons stock has a corrugation axis providing an axis of greatest buckling strength and wherein the corrugation axis is aligned in the longitudinal direction and wherein the bottom is attached to transversely extending support panels equal in area to the left and right upstanding sidewall, the support panels folding upward from the bottom to provide resistance to buckling.

5. The container of claim 1 wherein the front sidewall has at least two longitudinally spaced tab receiving slots and wherein the nose tap may engage different ones of the tab receiving slots on the front upstanding sidewall to allow the lid to contain within the container constant numbers of ears of corn of varying girth.

6. The container of claim 1 wherein the nose tab include folding flaps extending when unfolded across a direction of insertion of the nose tab into a slot so as to lock the nose tab into the slots when so inserted, the flaps folding against the nose tab for insertion into the slots and unfolding after the tab is inserted to lock the nose tab into the slot;

whereby pressure of the contained corn against the flaps locks the flaps into the unfolded position.

7. The container of claim 1 wherein the polymeric container stock is of corrugated construction.

8. The container of claim 1 wherein the lid includes a back hinge section hingeably attached at one edge of a center portion of the lid and at an opposite edge hingeably attached to the top edge of the back sidewall.

9. The container of claim 1 wherein the lid includes a front hinge section hingeably attached at one edge of a center portion of the lid and at an opposite edge hingeably attached to the nose tab.

10. The container of claim 3 wherein the nose tab includes a plurality of water rinse ports aligning with ones of the water rinse ports on the front upstanding sidewall.

11. The container of claim 3 wherein the polymeric cartons stock has a corrugation axis providing an axis of greatest buckling strength wherein the water rinse ports are elongate along an axis canted with respect to the corrugation axis.

* * * * *

UNITED STATES PATENT AND TRADEMARK OFFICE
CERTIFICATE OF CORRECTION

PATENT NO. : 5,642,854
DATED : July 1, 1997
INVENTOR(S) : Roger C. Hatton

It is certified that error appears in the above-indentified patent and that said Letters Patent is hereby corrected as shown below:

Column 4, Line 61, replace "from" with --front--.

Column 5, Line 3, replace "from" (2nd occurrence) with --front--.

In Claim 2, Colum 6, Line 42, replace "fight" with --right--.

Signed and Sealed this

Twenty-eighth Day of October, 1997

Attest:

BRUCE LEHMAN

Attesting Officer

Commissioner of Patents and Trademarks